United States Patent
Ashton et al.

(10) Patent No.: US 7,116,761 B2
(45) Date of Patent: Oct. 3, 2006

(54) FIBER TO THE CURB AND FIBER TO THE NEIGHBORHOOD POWER ARCHITECTURE

(75) Inventors: Curtis L. Ashton, Littleton, CO (US);
Bruce A. Phillips, Littleton, CO (US);
Jimmy G. Godby, Littleton, CO (US);
Richard H. Fink, Aurora, CO (US);
Robert C. Ferry, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/200,631

(22) Filed: Nov. 30, 1998

(65) Prior Publication Data

US 2003/0123648 A1    Jul. 3, 2003

(51) Int. Cl.
*H04B 10/12* (2006.01)
*H04M 11/00* (2006.01)

(52) U.S. Cl. .................... 379/56.2; 379/102.04

(58) Field of Classification Search ........ 359/135–137, 359/142–143, 160–167, 171, 173, 112, 110; 379/157, 184, 324, 379, 399, 413, 399.01, 379/56.1–56.3, 102.04, 106.04, 395.01; 370/532–534, 370/241; 709/226, 229; 398/33, 38, 94, 398/98, 1, 9, 66; 340/538, 636.1
See application file for complete search history.

(56) References Cited

U.S. PATENT DOCUMENTS

| | | | |
|---|---|---|---|
| 5,321,596 A | | 6/1994 | Hurst |
| 5,355,238 A | * | 10/1994 | Kight et al. ............... 398/98 |
| 5,355,401 A | * | 10/1994 | Skinner, Sr. ............. 379/56.2 |
| 5,369,518 A | | 11/1994 | Aslami et al. |
| 5,469,495 A | * | 11/1995 | Beveridge ................ 379/56.2 |
| 5,523,868 A | * | 6/1996 | Hawley ...................... 398/38 |
| 5,539,805 A | | 7/1996 | Bushue et al. |

(Continued)

FOREIGN PATENT DOCUMENTS

JP    07264333 A   * 10/1995

(Continued)

OTHER PUBLICATIONS

International Search Report—Feb. 24, 2000.

(Continued)

*Primary Examiner*—George Eng
(74) *Attorney, Agent, or Firm*—Townsend and Townsend and Crew LLP

(57) ABSTRACT

A system and method of powering a fiber optic communication network are provided which transmits communication data between a telephone company central office and remote user device. The system includes a power source configured to provide an electrical supply voltage to a digital subscriber line access multiplexer. The power source having an AC power feed for providing power to the digital subscriber line access multiplexer and a DC power feed for providing power to the digital subscriber line access multiplexer when the AC power feed is not supplying power. Further, an electrical conducting medium configured to conduct the electrical supply voltage and the communication data from the digital subscriber line access multiplexer to the remote user device is provided. Therefore, the present invention provides a system and method for reliably powering a fiber optic communication network with AC power under normal operating conditions and DC backup power when the AC power is interrupted, thus providing lifeline telephony service while, reducing maintenance costs by having a limited number of centralized remote power sites.

31 Claims, 7 Drawing Sheets

U.S. PATENT DOCUMENTS

| | | | |
|---|---|---|---|
| 5,550,476 A * | 8/1996 | Lau et al. | 324/522 |
| 5,557,437 A * | 9/1996 | Sakai et al. | 359/110 |
| 5,557,672 A | 9/1996 | Perry et al. | |
| 5,623,531 A * | 4/1997 | Nilssen | 379/324 |
| 5,640,512 A * | 6/1997 | Czerwiec | 370/241 |
| 5,654,592 A * | 8/1997 | Butler et al. | 359/137 |
| 5,664,002 A * | 9/1997 | Skinner, Sr. | 379/56.2 |
| 5,740,075 A * | 4/1998 | Bigham et al. | 709/229 |
| 5,825,516 A * | 10/1998 | Walsh | 359/112 |
| 5,889,465 A * | 3/1999 | Mercadante et al. | 340/636.2 |

FOREIGN PATENT DOCUMENTS

JP        08172490 A  *  7/1996

OTHER PUBLICATIONS

Ashton, Curtis, Telephony, Powering the Network, Backup Power's, Sep. 7, 1998, 5 pages.

* cited by examiner

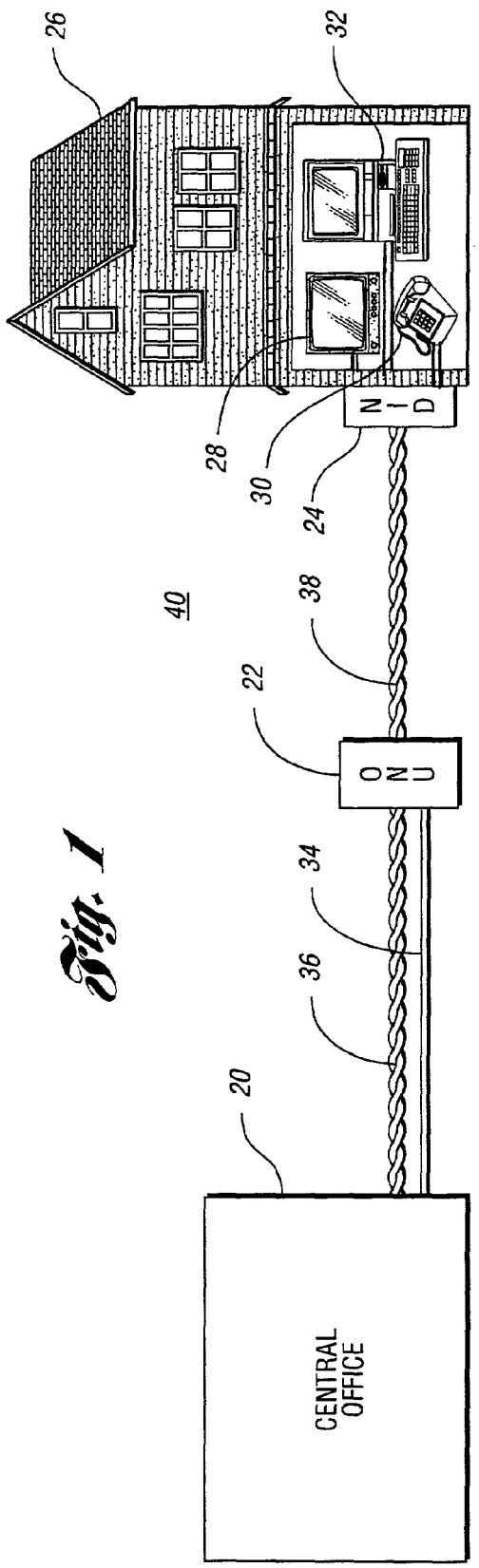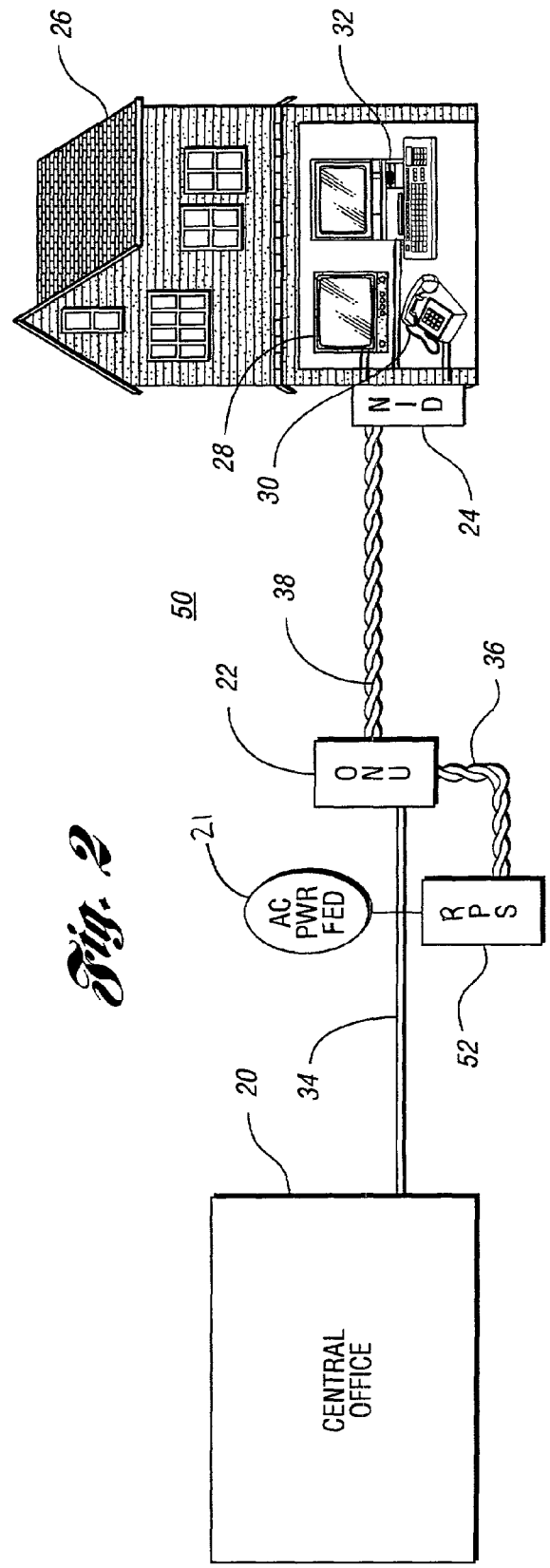

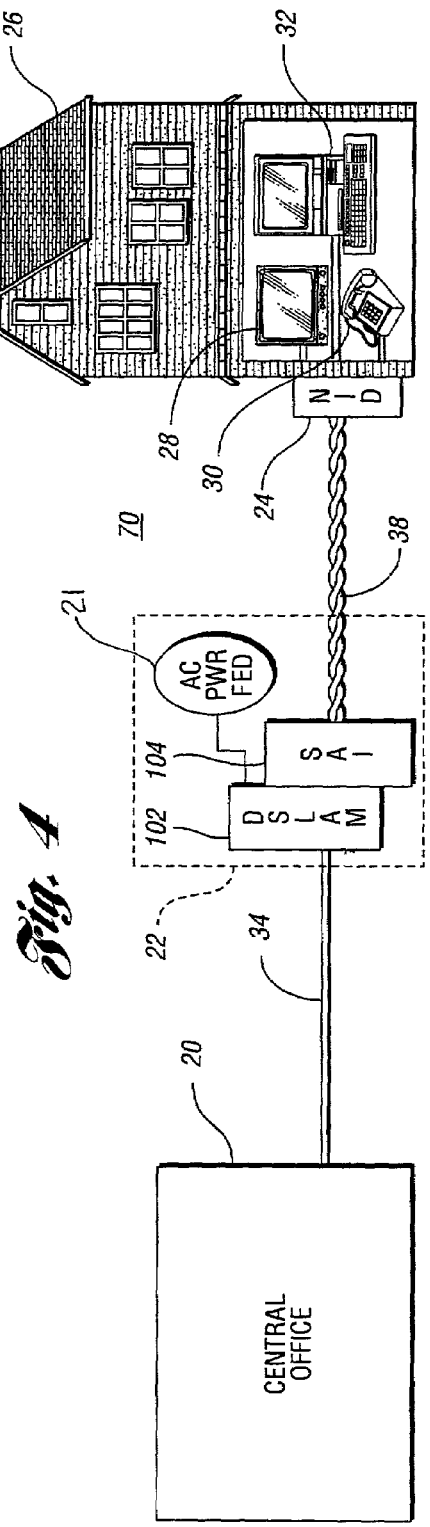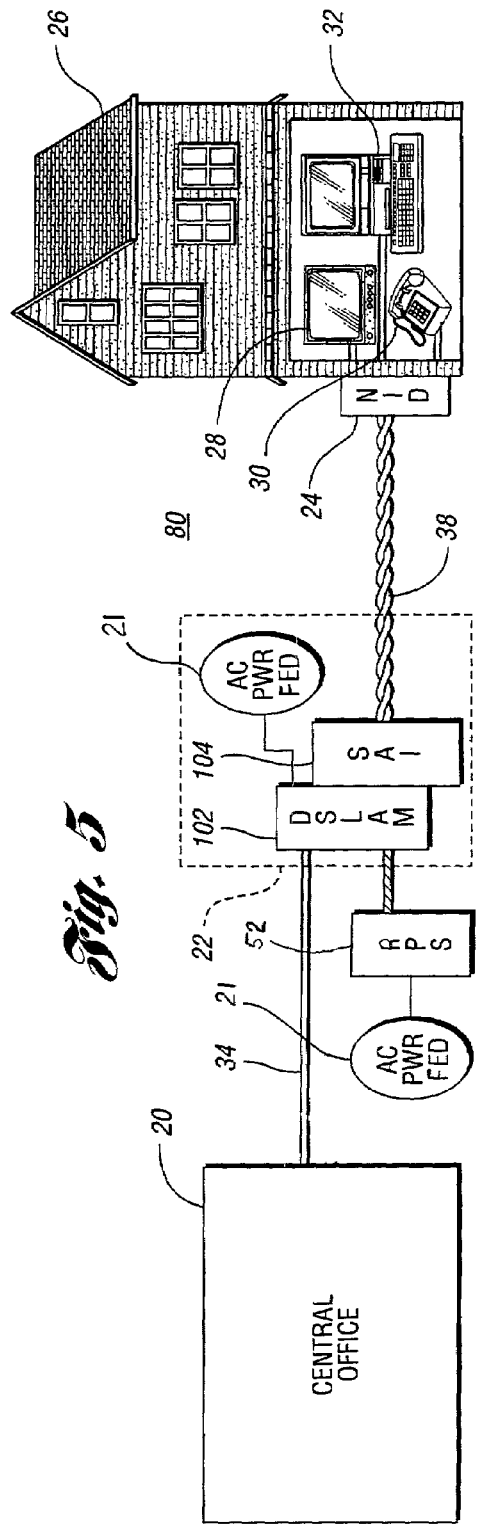

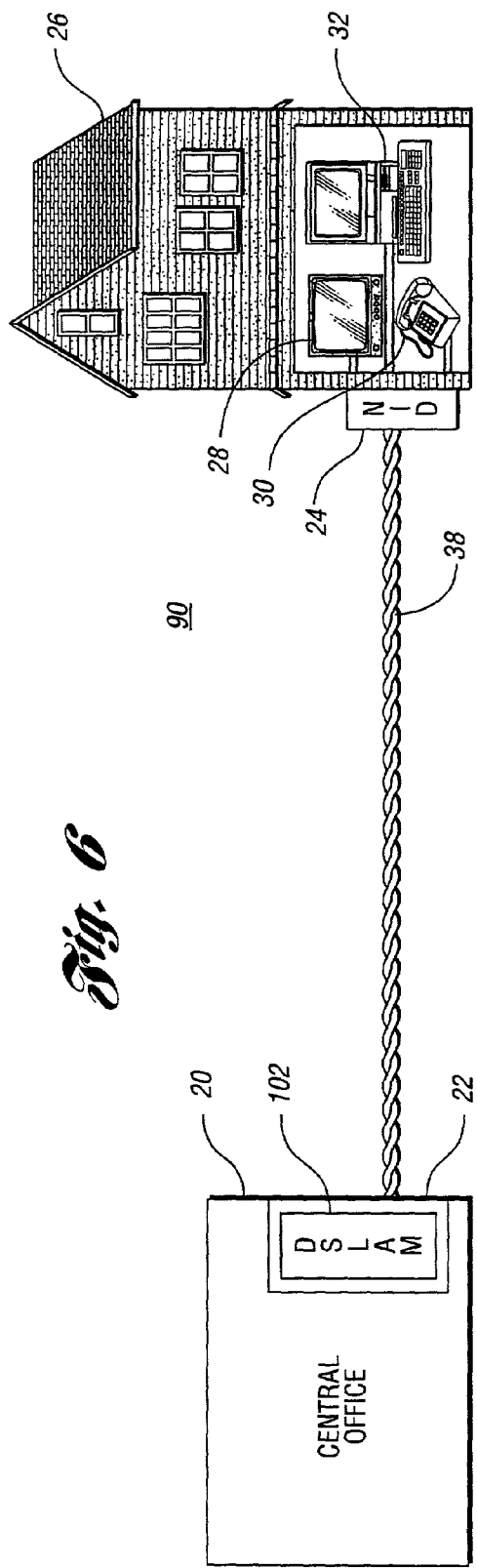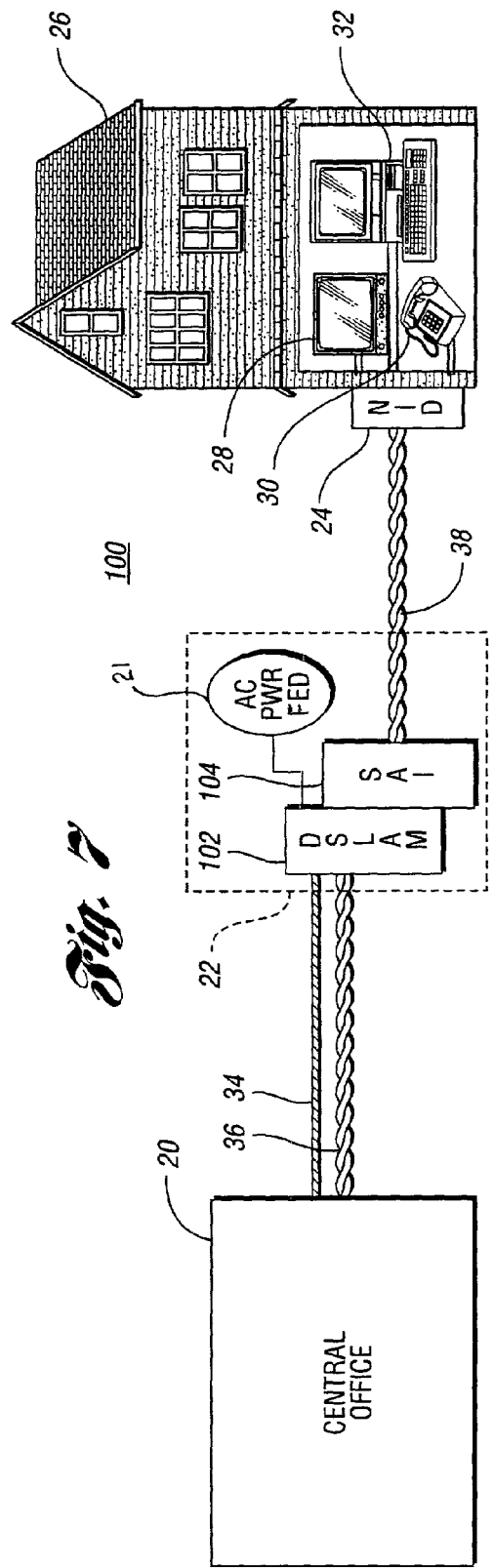

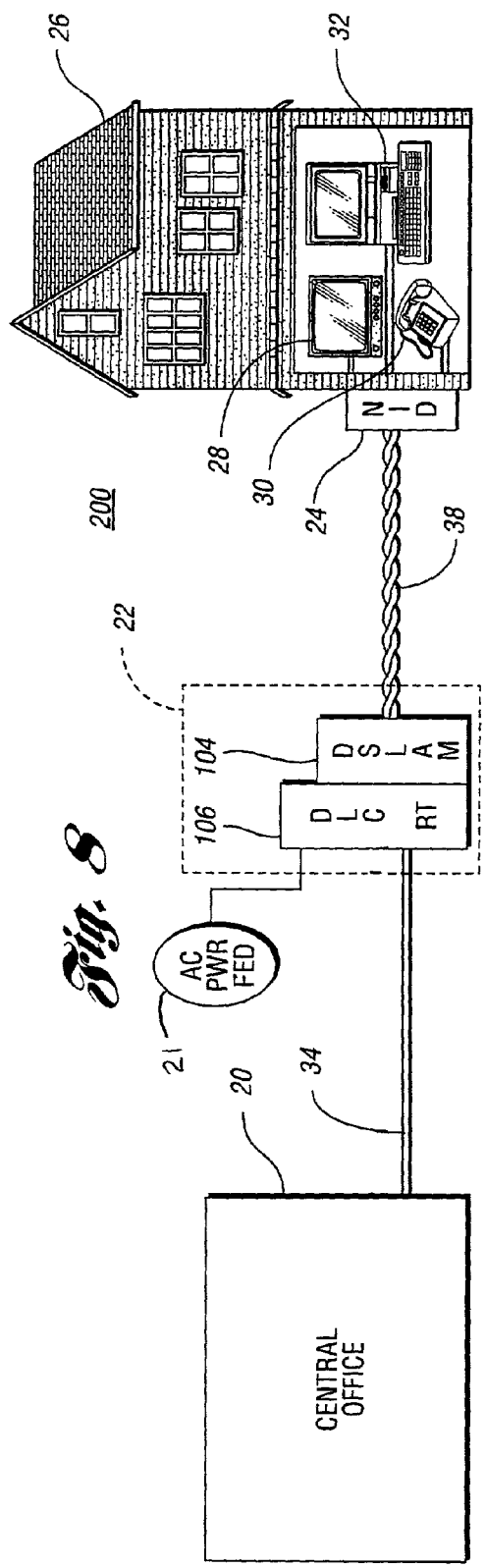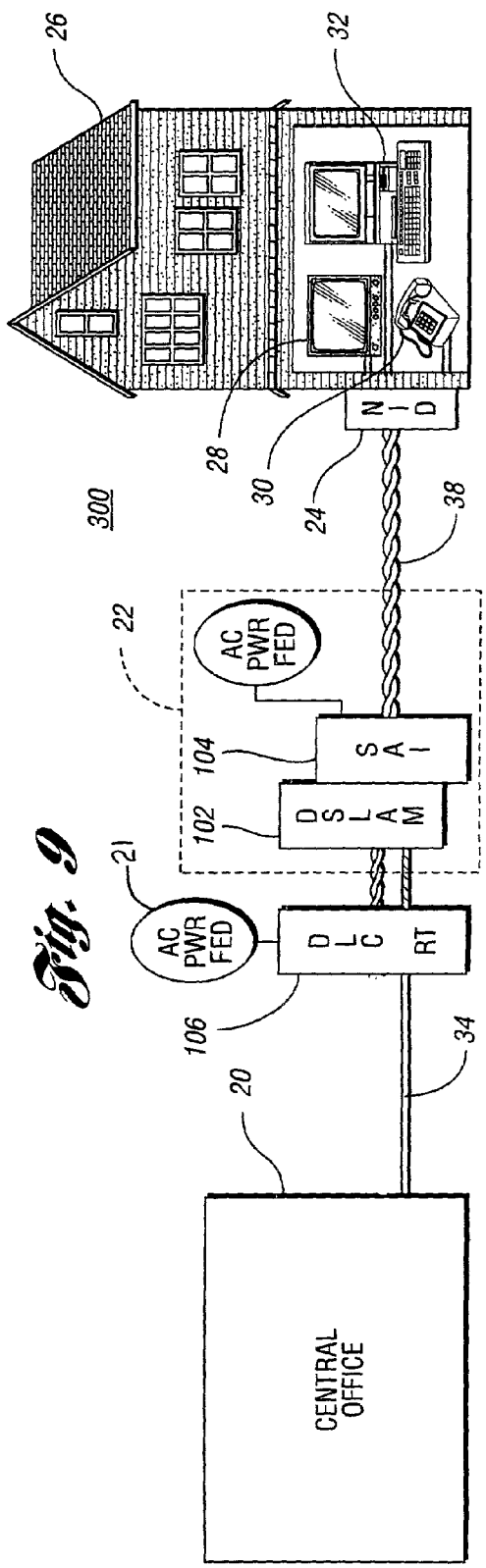

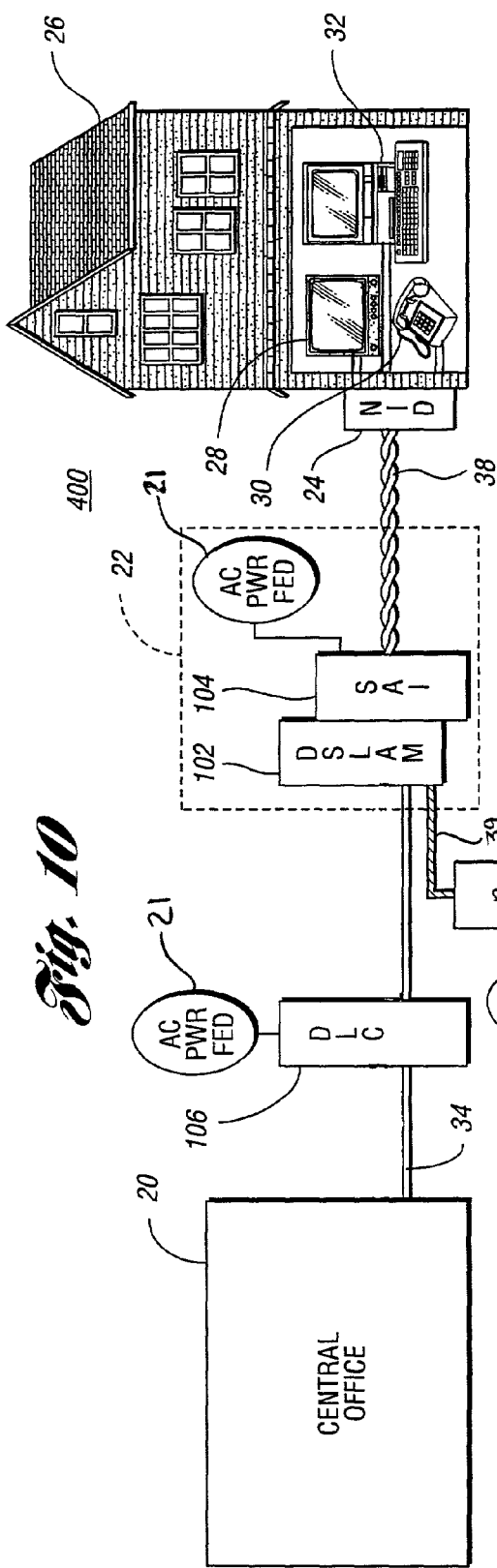
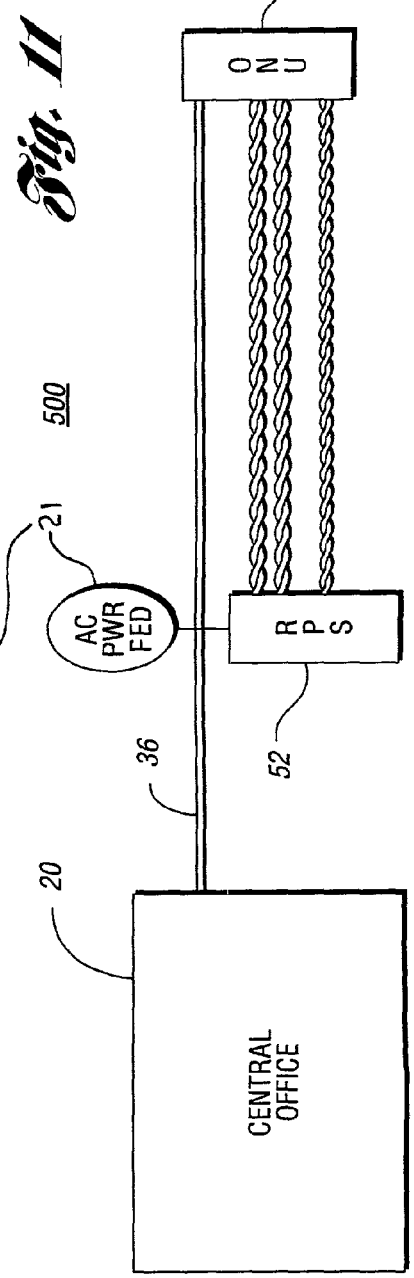

FIBER TO THE CURB AND FIBER TO THE NEIGHBORHOOD POWER ARCHITECTURE

TECHNICAL FIELD

The present invention relates to a powering architecture for energizing a fiber optic communication network and customer telephones with an AC power feed under normal operating conditions and DC backup power when the AC power is not available.

BACKGROUND ART

With increasing customer demand for information to be supplied to homes and businesses, telephone communication companies are being pushed to upgrade their communication network infrastructures. In order to supply more information in the form of video, audio and telephony at higher rates, higher bandwidth communication networks are required. Conventional telephone communication network infrastructures utilize fiber optics and twisted copper pair wire to send communication data to a customer. Fiber optic cable supports a high bandwidth while, twisted copper wire supports relatively low bandwidth over long distances. In operation, the fiber optic cable portion of the communications network transmits digital light bits to an optical network unit (ONU). The optical network unit converts the digital light bits to an analog signal which is received by a conventional customer telephone.

Generally, customers who are within two to three miles of a telephone company's central office are fed communication data solely using twisted copper pair. The twisted copper pair carries the phone signals as well as a −48 volts DC power to operate and ring the phones. Large cables (thousands of pairs), are routed through the telephone central office switch and branch out to various manholes, poles, and cross-connect points to customer locations. For customers who are further away, a digital loop carrier (DLC) cabinet, hut, or buried vault is placed in an area and reaches up to a two-mile radius. High speed copper lines (T1, DS1, etc.) or fiber cable feed digital bits from the telephone central office to the DLC. Similar to the ONU, the DLC converts the digital signal to an analog waveform required to operate the telephones. A copper drop (twisted copper pairs) relays the analog signals to a customer's home over a radius of two to three miles around the DLC site. The DLC cabinet contains its own batteries, power rectifiers, converters, and a connection for a portable generator. Additionally, the DLC cabinet is connected to an AC power feed from the local power company. For a business or residential customer requiring higher speed data than the standard telephony service, high speed copper or fiber data circuits are routed from the DLC or the CO to the customer location.

The twisted copper cable will not support high bandwidths over a great distance. In order to achieve high bandwidths at a customer location, the fiber optic loop must be brought closer to the customer so that the copper drop is a sufficiently short distance and will be capable of supporting high data transfer rates. One major problem with bringing fiber cable within a short distance of a customer location is the added burden of maintaining the multitude of optical network units (ONUs) which will be required and will typically only serve between twelve to ninety-six customers. Conventional telephone networks utilizing DLCs do not have this problem because there are far fewer DLCs given their capability of serving approximately four hundred to two thousand customers each. Each ONU will require power to make the digital to analog conversion to run the telephones and provide lifeline telephony. Lifeline telephony is required of all telephone communication networks. Lifeline telephony means that the customer telephones must remain energized and operational during an AC power interruption and outage.

As such, a need exists for a system and method for powering a fiber optic communication network which brings fiber within a short distance of a customer location. The fiber optic communication network power architecture must be capable of supporting lifeline telephony and operate the multitude of optical network units in a cost effective and maintainable manner.

DISCLOSURE OF INVENTION

Accordingly, it is an object of the present invention to provide a system and method for reliably powering a fiber optic communication network with AC power under normal operating conditions and DC backup power when the AC power is interrupted, thus providing lifeline telephony service.

It is another object of the present invention to provide a system and method for powering a fiber optic communication network which reduces maintenance costs by providing a limited number of centralized remote power sources.

In accordance with these and other objects, the present invention provides a system and method of powering a fiber optic communication network which transmits communication data between a telephone company central office and a user device. The user device may be a conventional telephone, television, computer or any combination of these devices. The system for powering the fiber optic communication network includes a digital subscriber line access multiplexer (DSLAM) for converting the communication data from an optical state to an electrical state, a fiber optic communication medium (fiber multiplexer) configured to transfer the communication data between the telephone company's central office and the DSLAM. The system further includes a power source configured to supply an electrical supply voltage to power the digital subscriber line access multiplexer, the power source having an AC power feed for providing power to the digital subscriber line access multiplexer, and a DC power feed for providing power to the digital subscriber line access multiplexer when the AC power feed is not supplying power to the digital subscriber line access multiplexer. Further still, an electrical conducting medium configured to conduct the electrical supply voltage and the communication data from the digital subscriber line access multiplexer to a network interface device in electrical communication with the remote user device is provided.

The above objects and other objects, features and advantages of the present invention are readily apparent from the detailed description of the best mode for carrying out the invention when taken in connection with the accompanying drawings.

BRIEF DESCRIPTION OF DRAWINGS

FIG. 1 is a block diagram of a powering architecture for energizing a fiber optic communication network in a fiber to the curb configuration where the optical network unit is less than nine thousand feet from the central office, in accordance with the present invention.

FIG. 2 is a block diagram of a powering architecture for energizing a fiber optic communication network in a fiber to the curb configuration where the optical network unit is greater than nine thousand feet from the central office, in accordance with the present invention.

FIG. 4 is a block diagram of a powering architecture for energizing a fiber optic communication network in a fiber to the neighborhood configuration where the optical network unit includes a DSLAM and a SAI and is greater than 9,000 feet from the central office, in accordance with the present invention.

FIG. 5 is a block diagram of a powering architecture for energizing a fiber optic communication network in a fiber to the neighborhood configuration where the optical network unit includes a DSLAM and a SAI which are greater than nine thousand feet from the central office but less than six thousand feet from the optical network unit, in accordance with the present invention.

FIG. 6 is a block diagram of a powering architecture for energizing a fiber optic communication network in a fiber to the neighborhood configuration where a customer is less than four thousand feet from the central office, in accordance with the present invention.

FIG. 7 is a block diagram of a powering architecture for energizing a fiber optic communication network in a fiber to the neighborhood configuration where the ONU includes a DSLAM and a SAI and is less than six thousand feet from the central office and less than four thousand feet from the customer, in accordance with the present invention.

FIG. 8 is a block diagram of a powering architecture for energizing a fiber optic communication network in a fiber to the neighborhood configuration where the optical network unit is a DSLAM which is collocated with a DLC, where the DLC and DSLAM are less than four thousand feet from the customer, in accordance with the present invention.

FIG. 9 is a block diagram of a powering architecture for energizing a fiber optic communication network in a fiber to the neighborhood configuration where the optical network unit contains a DSLAM and an SAI and where the network unit is less than six thousand feet from the DLC and less than four thousand feet from the customer, in accordance with the present invention.

FIG. 10 is a block diagram of a powering architecture for energizing a fiber optic communication network in a fiber to the neighborhood configuration wherein the optical network unit comprises a DSLAM and a SAI and is greater than six thousand feet from the DLC and less than four thousand from the customer, in accordance with the present invention.

FIG. 11 illustrates an alarm system for monitoring a remote power system.

BEST MODE FOR CARRYING OUT THE INVENTION

Figure 3:
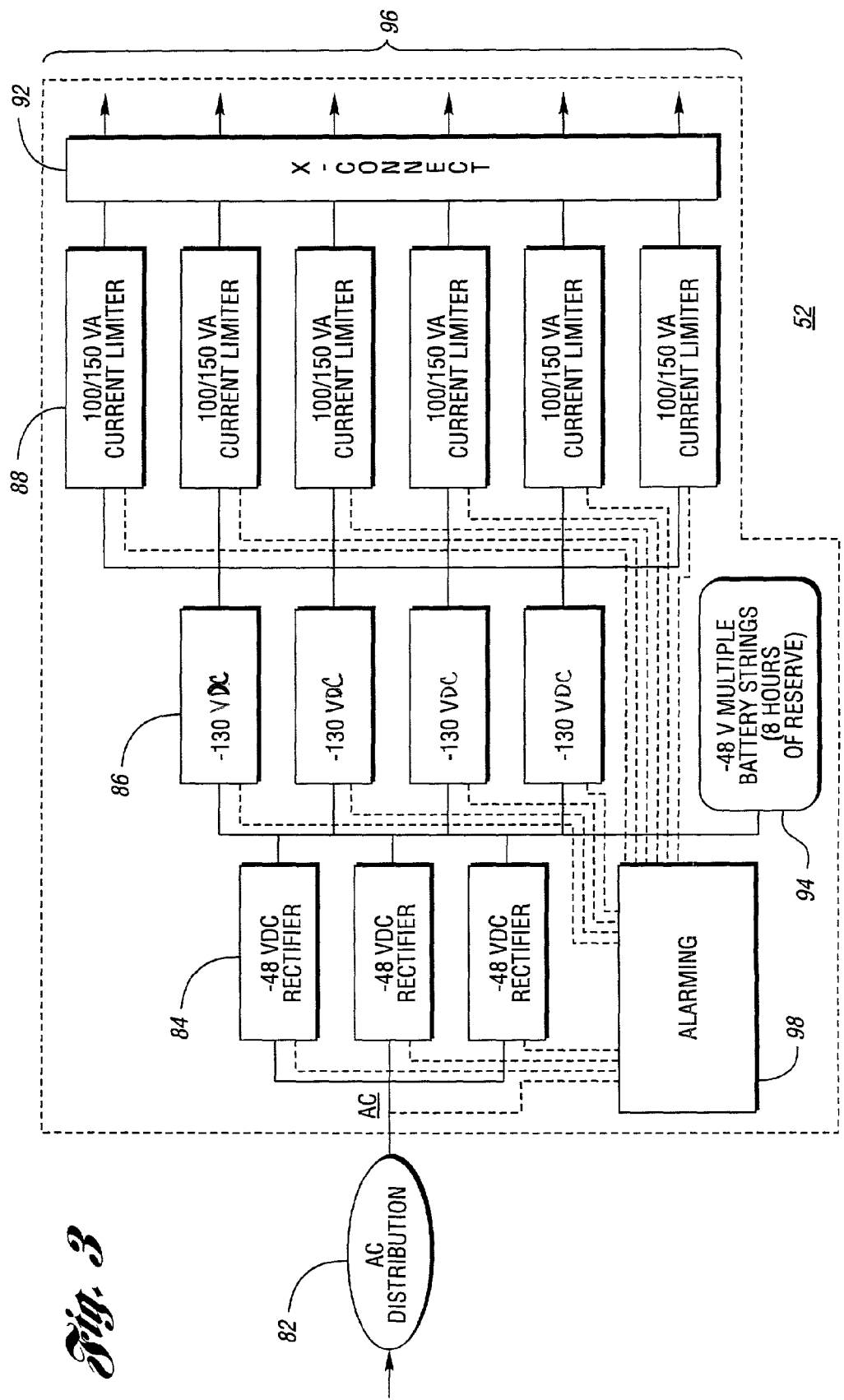
FIG. 3 is a detailed block diagram of a remote power source which powers the optical network unit, where the optical network unit is greater than nine thousand feet from the central office, in accordance with the present invention.

Referring now to FIG. 1, exemplary embodiments of an electrical power architecture for a fiber optic communication network is shown incorporating lifeline telephony powering of customer telephones, according to the present invention. Network elements identical to those described in connection with FIG. 1 have been denoted with like reference numerals in FIGS. 2 through 10. A fiber optic cable 34 is placed between a telephone company central office 20 and an optical network unit (ONU) 22. The fiber optic cable 34 carries communication data in the form of light bits to the optical network unit 22. The optical network unit 22 converts the communication data from a digital light bit state to a digital electrical bit state for communication along the copper drop 38. The copper drop 38 is electrically connected to a network interface device (NID) 24 which is attached to a customer location 26 and receives the communication data. The customer location 26 generally contains a television 28, a telephone 30, and a computer 32 which are in electrical communication with the NID 24 and receive the communication data. The television 28 receives video and audio communication data. The television 28 may include a built-in receiver device or a set-top receiver device which receives digital communication data from the NID 24 and converts the communication data to a format which can be displayed on the television screen. The telephone 30 receives audio communication data and the computer 32 may receive audio as well as video communication data from the NID 24.

In accordance with the present invention when the ONU 22 is less than nine thousand feet from the central office 20, a twisted copper cable 36 is trenched with the fiber optic cable 34 to power the optical network unit 22. The twisted copper cable 36 powers the ONU 22 with a supply voltage of minus 130 VDC. The supply voltage is higher than the minus 48 VDC, required to power the telephones, to compensate for transmission losses. The copper drop 38 is a twisted copper pair cable with a length of less than 750 feet. This communication network configuration is referred to as fiber to the curb as it locates fiber optic cable within a short distance from a customer location 26. A copper drop 38 of less than 750 feet provides a customer with 52 megabits per second of bandwidth. Providing a customer with higher bandwidths allows the customer to receive a greater amount of communication data. The upstream bandwidth in this configuration is approximately 19 megabits per second. The upstream bandwidth is the rate at which a customer can send communication data back through to the central office 20.

In operation the present invention ensures lifeline telephony when an AC power outage occurs. The twisted copper pair cable 36 carries DC electrical power from a power source (not shown) in the central office 20 to the optical network unit 22, therefore the ONU 22 does not require batteries and converters and rectifiers. In this configuration the optical network unit 22 requires little maintenance. The converters, rectifiers, current limiters, and batteries are located in the central office and may be easily maintained. When a power outage occurs, power from the batteries is carried over the twisted copper cable 36 to the optical network unit 22 to ensure that the optical network unit is operational during the AC power outage. The optical network unit converts and transmits the power carried on the twisted copper cable 36 to the copper drop cable 38, which in turn carries the supply voltage to keep alive the telephones 30. The powering architecture just described ensures lifeline telephony to the customer location 26.

In an alternative embodiment, a fiber to the curb power architecture where the optical network unit 22 is greater than nine thousand feet from the central office 20 is illustrated in FIG. 2. The components of the fiber to the curb power architecture 40 of FIG. 1 are the same as the fiber to the curb power architecture 50 of FIG. 2, with the addition of a remote power source (RPS) 52. The RPS 52 is used to power the optical network unit 22 and is itself powered by conventional AC power feed 21, originating from a local power company. Additionally, RPS 52 contains batteries which are capable of powering the optical network unit 22 during a power outage. The ONU 22 in turn powers customer telephones 30 ensuring lifeline telephony during power outages. The RPS 52 is located within nine thousand feet of the optical network unit 22. The RPS 52 feeds power to several ONUs centralizing power supplied at the RPS rather than the ONUs. This powering scheme reduces the number of power sites the telephone communication company has to maintain.

Referring now to FIG. 3, a detailed block diagram illustrating the contents of the remote power source 52 is shown. Remote power source 52 is connected to an AC distribution circuit 82 which supplies AC current to the remote power source circuit. Rectifiers 84 convert the AC to a minus 48 volts DC. Converters 86 convert the minus 48 volts DC (VDC) to a minus 130 volts DC (VDC). Current limiters 88 limit the current to between 100 and 150 volt-amps. Connector block 92 distributes the appropriate supply power voltage and current to a plurality of twisted copper pairs 96. Multiple battery strings 94 supply back-up power at minus 48 volts DC to the converters 86 when an AC power outage occurs. Batteries strings 94 can power the telephony cards of the optical network units for at least eight hours.

With continued reference to FIG. 3, an alarming system 98 is illustrated. Alarming system 98 provides electrical communication to key points in the remote power source circuit. Information pertaining to the RPS's 52 operation is relayed to the telephone company's central office 20. Key points in the remote power source circuit which are monitored include but are not limited to, the AC power source, the rectifiers 84 voltage, the converters 86 voltage, and current limiters 88 current. Alarming may be simple contact closures or a more sophisticated power monitor reporting over a secure protocol, such as a TCP-IP and a RS-485 link. With the information supplied by the alarming scheme 98, the central office 20 is able to determine whether the RPS 52 requires maintenance.

In an alternative embodiment as shown in FIG. 4, a fiber to the neighborhood power configuration is illustrated. In the fiber to the neighborhood configuration 70, the optical network unit includes a digital subscriber line access multiplexer (DSLAM) 102 and a serving area interface (SAI) 104 which are capable of supporting approximately sixty-four to one hundred and twenty-eight video or data subscribers or customers and approximately three hundred to five hundred telephony customers. The DSLAM 102 converts digital light bits received from the fiber optic cable 34 to digital electrical bits and supplies the digital information to the customer 26. Essentially, the SAI 104 is a cross connect box which allows the telephone company to piggyback the video and data signals from the DSLAM onto the copper drop 38 to provide additional services to the customer location 26. The DSLAM 102 and SAI 104 are co-located and are typically placed at a distance greater than nine thousand feet from the central office 20. In the fiber to the neighborhood configuration 70, the DSLAM 102 and SAI units 104 are within four thousand feet of the customer residence 26. A minimum of thirteen to twenty-six megabit per second bandwidth is achievable with a copper drop 38 of no more than four thousand feet. The DSLAM 102 is AC powered by the AC power fed 21 and contains batteries for providing a backup supply voltage to the telephone 30 when the AC power fails. The supply voltage is transmitted from the DSLAM 102 to the SAI 104 and then onto the copper drop 38 to the NID unit 24 and finally to the customer telephone 30. This configuration ensures that lifeline telephony is provided to the customer 26 at all times including power outages.

In an alternative embodiment, a fiber to the neighborhood 80 power architecture is illustrated in FIG. 5. In this configuration, the optical network unit 22 is comprised of the DSLAM 102 and the SAI 104 and is typically located more than nine thousand feet from the central office 20 but within four thousand feet of the customer 26. A remote power source (RPS) 52 supplies the DSLAM 102 with a supply voltage (of minus 130 VDC) to operate and contains batteries to supply the DSLAM 102 with backup power when an AC power interruption or outage occurs. The DSLAM 102 and SAI 104 are located less than six thousand feet from the RPS 52. The RPS 52 can supply power to multiple DSLAM units, thus centralizing supply power and backup power at the RPS 52. This powering scheme decreases the number of power source sites requiring maintenance.

Now referring to FIG. 6, an alternative embodiment for a fiber to the neighborhood power architecture 90 is illustrated. In a preferred embodiment, the optical network unit 22 includes a DSLAM 102 and is located in the central office 20. The copper drop 38 carries the communication data to the customer 26 who is within four thousand feet of the central office 20. The bandwidth for the copper drop 38, if less than four thousand feet, is a minimum of 13 megabits per second downstream and 3 megabits per second upstream. However, if the copper drop 38 is less than three thousand feet the bandwidth is at least 26 megabits per second downstream and 3 megabits per second upstream. Lifeline telephony is supported through a battery backup power source (not shown) similar to the RPS 52 located in the central office 20.

Referring now to FIG. 7, an alternative embodiment of a fiber optic network powering architecture 100 is illustrated, according to the present invention. In a preferred embodiment, the optical network unit 22 consists of a DSLAM 102 and a SAI unit 104. The DSLAM and SAI are located between four and six thousand feet from the central office 20 and less than four thousand feet from the customer 26. Having a copper drop 38 of less than four thousand feet provides a bandwidth of at least 13 megabits per second to the network interface device 24. In operation, when a power outage occurs, the AC power feed to the DSLAM 102 is non-existent and backup power is fed from central office 20 through the twisted copper pair 36 to the SAI unit 104 and then to the customer telephone 30. Alternatively, or when the twisted copper pair 36 is not present (i.e., in a new construction area), lifeline telephony is supported by a battery backup power source located within the DSLAM. When an AC power outage occurs the DSLAM batteries (not shown) will supply DC power to the DSLAM and to the customer telephone 30 via twisted copper pair 38.

Referring now to FIG. 8, an alternative embodiment of the present invention illustrating a fiber to the neighborhood powering architecture 200 is shown. In a preferred embodiment, DSLAM 102 is located more than fifteen thousand feet from the central office 20 and within four thousand feet of the customer 26. The optical network unit 22 includes a digital loop carrier (DLC) 106 which transfers the communication data from the central office 20 to the DSLAM unit 102. The DLC unit 106 is AC power fed from the power company and contains batteries for supplying backup power to the DSLAM. During a power interruption or failure, the DLC 106 and the DSLAM unit 102 are powered from the DLC backup battery power source (not shown), which in turn power the customer telephone 30 using the copper drop 38, thereby achieving lifeline telephony.

Referring now to FIG. 9, an alternate embodiment of a fiber to the neighborhood power architecture 300, according to the present invention is illustrated. An optical network unit 22 having a DSLAM 102 and a SAI 104 is located less than six thousand feet from the DLC 106 and is less than four thousand feet from customer 26. The DLC however, is greater than eighteen thousand feet from the central office 20. The DLC is AC power fed by the power company and contains batteries to supply backup power to the telephony copper drops 38 when an AC power interruption occurs. Batteries contained in the DLC 106 supply backup power (−48 VDC) to the DSLAM 102 which will power the customer telephones 30 using the copper drop 38 insuring lifeline telephony during AC power interruptions.

In still another embodiment of the present invention, a fiber to the neighborhood power architecture 400 is illustrated in FIG. 10. In the present configuration, DSLAM 102 is greater than six thousand feet from the DLC 106 and within four thousand feet of the customer 26. The DLC unit 106 however, is greater than fifteen thousand feet from the central office 20 and is AC power fed by the power company. An RPS unit 52 supplies backup power over a twisted copper pair 39 to the DSLAM 102 and is located within six thousand feet of the DSLAM. Once the backup power is supplied to the DSLAM 102, the telephone 30 receive power from the DSLAM over the twisted copper pairs 38.

Now with reference to FIG. 11, an alarm system 500 for monitoring the remote power system 52 is illustrated. A plurality of twisted copper pairs 110 run between the optical network unit 22 and the RPS unit 52. The twisted copper pairs 110 transport binary alarms, plus there may be one pair for dial-up access to a power monitor (not shown). In operation, alarm system 500 enables the central office to use the fiber optic cable 36 to monitor the power level and other operational parameters of the RPS 52 (as further shown in FIG. 3 and described previously). Alternatively, the alarm power system 500 can use an RS 485 circuit (or similar circuit) which can transmit data to the optical network unit 22 using a secure two-way protocol such as an X.25 or a TCP/IP.

Figure 12:
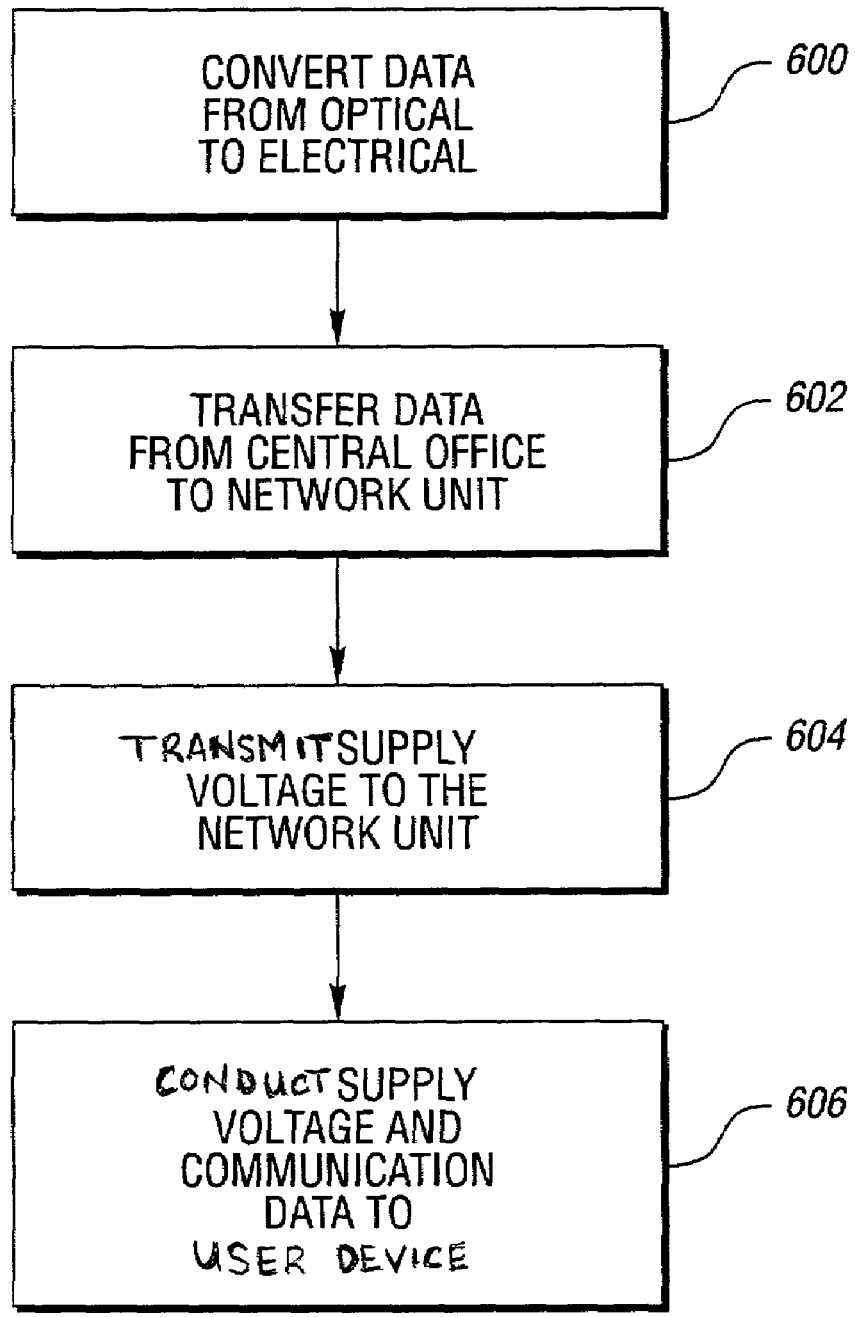
FIG. 12 is a flow chart illustrating a method for powering a fiber optic communication network.

With reference to FIG. 12, a flow chart illustrates the method of the present invention. More specifically, at block 600 the communication data is converted from an optical state to an electrical state. At block 602 the communication data is transferred from the telephone company's central office (CO) to the optical network unit. At block 604 a supply voltage is transmitted to the ONU from a power source which may be located remote form the DSLAM or proximate to the DSLAM, DCL, or the CO. The power source is capable of suppling backup power to the ONU when an AC power interruption occurs. Finally, at block 606 the supply voltage and the communication data are conducted along a copper drop to establish telephone communication with a customer telephone to ensure lifeline telephony during AC power interruptions.

While embodiments of the invention have been illustrated and described, it is not intended that these embodiments illustrate and describe all possible forms of the invention. The words used in the specification are words of description rather than limitation, and various changes may be made without departing from the spirit and scope of the invention.

What is claimed is:

1. A system for powering one or more devices in a fiber optic communication network, which transmits communication data between a telecommunications service provider and a remote user device, the system comprising:
   an optical network node for converting the communication data from a digital optical state to a digital electrical state;
   a fiber optic communication medium configured to transfer the communication data between the telecommunications service provider and the optical network node; and
   an electrical power source configured to supply an electrical supply voltage to power the optical network node;
   an electrical transmission medium configured to transmit electrical power from the electrical power source to the optical network node; and
   an alarm system incorporated within the electrical power source, the alarm system being configured to monitor the operation of the electrical power source and to allow the provider to monitor an operational parameter of the power source via the fiber optic communication medium.

2. The system of claim 1, wherein the electrical power source is located proximate to the optical network node.

3. The system of claim 1, wherein the electrical power source is remote from the optical network node and supplies power to a plurality of optical network nodes.

4. The system of claim 1, wherein the electrical power source is located proximate to the telecommunications service provider.

5. The system of claim 1, wherein the electrical power source is located proximate to a digital loop carrier.

6. The system of claim 1, wherein the remote user device is a telephone.

7. The system of claim 1, wherein the remote user device is a computer.

8. The system of claim 1, wherein the remote user device is a television.

9. The system as recited in claim 1, wherein the optical network node comprises an optical network unit (ONU).

10. The system as recited in claim 1, wherein the optical network node comprises a digital subscriber line access multiplexer (DSLAM).

11. The system as recited in claim 1, wherein the electrical power source comprises an AC power feed for providing power to the electrical power source during normal operation and a DC power feed for providing power to the electrical power source when the AC power feed is inoperable.

12. The system of claim 11, wherein the electrical power source comprises a plurality of rectifiers, a plurality of converters, a plurality of current limiters, and a plurality of batteries configured to supply the DC voltage to the electrical power source.

13. The system as recited in claim 1, further comprising an electrical conducting medium configured to conduct the electrical supply voltage and the communication data from the optical network node to a the remote user device.

14. The system as recited in claim 13, further comprising a network interface device connected between the optical network node and the remote user device.

15. The system of claim 1, wherein the electrical power source operation information is selected from a group consisting of information about an AC power source, information about a rectifier's voltage, information about a converter's voltage, and information about a current limiter's current.

16. A method for powering one or more devices in a fiber optic communication network, which transmits communication data between a telecommunications service provider and a user device, the method comprising:
   transferring via an fiber optic communication medium digital communication data between the telecommunications service provider and an optical network node;

converting the digital communication data from an optical state to an electrical state using the optical network node;

transmitting with an electrical transmission medium an electrical supply voltage from an electrical power source to the optical network node;

providing an alarm system in the electrical power source;

monitoring the operation of the electrical power source with the alarm system in the electrical power source; and the provider monitoring an operational parameter of the power source via the fiber optic communication medium.

17. The method as recited in claim 16, wherein the step of transferring digital communication data between the telecommunications service provider and the optical network node comprises transferring digital communication data between the telecommunications service provider and an optical network unit (ONU).

18. The method as recited in claim 16, wherein the step of transferring digital communication data between the telecommunications service provider and the optical network node comprises transferring digital communication data between the telecommunications service provider and a digital subscriber line access multiplexer (DSLAM).

19. The method as recited in claim 16, wherein the step of transmitting electrical power source operation information from the alarm system to the telecommunications service provider comprises transmitting alarm signals to the telecommunications service provider.

20. The method as recited in claim 16, wherein the step of transmitting electrical power source operation information from the alarm system to the telecommunications service provider comprises transmitting power level and operational data to the telecommunications service provider.

21. The method as recited in claim 16, wherein the step of transmitting an electrical supply voltage from an electrical power source to the optical network node comprises an AC power feed supplying power to the electrical power source during normal operation and a DC power feed supplying power to the electrical power source when the AC power feed is inoperable.

22. The method as recited in claim 16, further comprising conducting both the electrical supply voltage and the digital communication data along a single electrical conducting medium from the optical network node to the remote user device.

23. The method as recited in claim 22, further comprising network interface device interfacing between the optical network node and the remote user device.

24. The method as recited in claim 16, wherein monitoring the operation of the electrical power source comprises monitoring information selected from a group consisting of information about an AC power source, information about a rectifier's voltage, information about a converter's voltage, and information about a current limiter's current.

25. A system for powering one or more devices in a fiber optic communication network, which transmits communication data between a telecommunications service provider and a remote user device, the system comprising:

an optical network node for converting the communication data from a digital optical state to a digital electrical state;

a fiber optic communication medium configured to transfer the communication data between the telecommunications service provider and the optical network node; and an electrical power source remote from the optical network node and configured to supply an electrical supply voltage to power the optical network node;

an electrical transmission medium configured to transmit electrical power from the electrical power source to the optical network node; and an alarm system incorporated within the electrical power source, the alarm system being configured to monitor the operation of the electrical power source and transmit electrical power source operation information to the telecommunications service provider.

26. The system of claim 25, further comprising one or more conducting mediums configured to connect the alarm system in the electrical power source to the optical network node for relaying power source operation information to the telecommunications service provider over the fiber optic communication medium.

27. The system of claim 25, wherein the electrical power source operation information is transmitted to the telecommunications service provider via a medium other than the fiber optic communication medium.

28. A system as recited in claim 25, wherein the electrical power source is configured to supply an electrical supply voltage to power a plurality of optical network nodes.

29. A method for powering one or more devices in a fiber optic communication network, which transmits communication data between a telecommunications service provider and a user device, the method comprising:

transferring digital communication data between the telecommunications service provider and an optical network node;

converting the digital communication data from an optical state to an electrical state using the optical network node;

transmitting with an electrical transmission medium an electrical supply voltage from an electrical power source to the optical network node, wherein the electrical power source is remote from the optical network node;

providing an alarm system in the electrical power source;

monitoring the operation of the electrical power source with the alarm system in the electrical power source; and transmitting electrical power source operation information from the alarm system to the telecommunications service provider.

30. The method of claim 29, wherein transferring digital communication data between the telecommunications service provider and the optical network node comprises transmitting the digital communication data via a fiber optic communication medium, and wherein transmitting electrical power source operation information from the alarm system to the telecommunications service provider comprises transmitting electrical power source operation information via a medium other than the fiber optic communication medium.

31. A method as recited in claim 29, wherein the electrical power source is configured to supply an electrical supply voltage to power a plurality of optical network nodes.

* * * * *